Nov. 24, 1953  K. P. RYAN  2,660,014
DISK HARROW GANG AND FRAME CONNECTION
Filed April 29, 1949  2 Sheets-Sheet 1
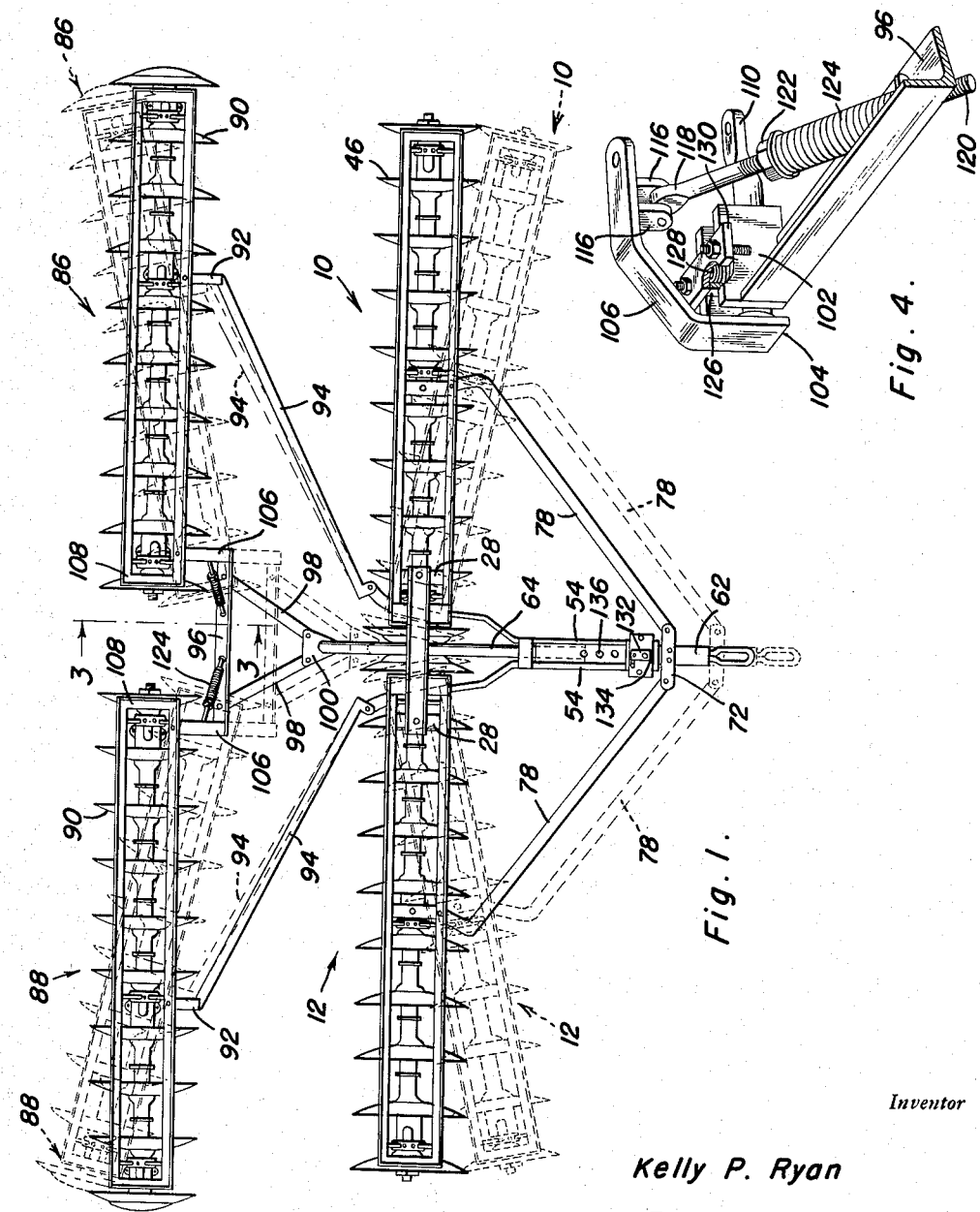
Inventor
Kelly P. Ryan Nov. 24, 1953  K. P. RYAN  2,660,014
DISK HARROW GANG AND FRAME CONNECTION
Filed April 29, 1949  2 Sheets-Sheet 2
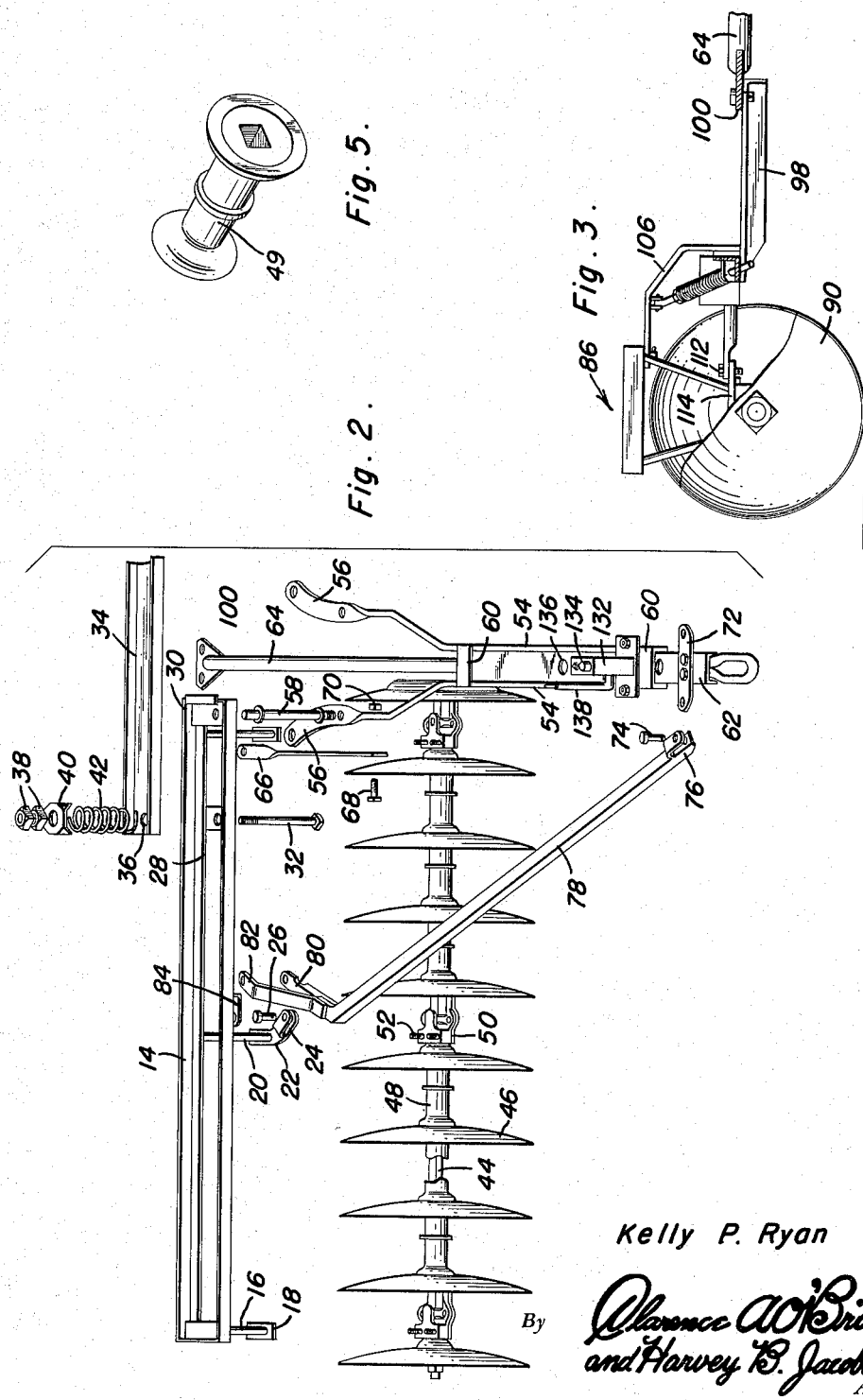
Inventor
Kelly P. Ryan Patented Nov. 24, 1953

2,660,014

UNITED STATES PATENT OFFICE 2,660,014

DISK HARROW GANG AND FRAME CONNECTION

Kelly P. Ryan, Blair, Nebr., assignor to Kelly Ryan Equipment Company, Blair, Nebr.

Application April 29, 1949, Serial No. 90,443

7 Claims. (Cl. 55—83)

This invention relates to new and useful improvements in agricultural implements, and the primary object of the present invention is to provide an agricultural implement including a plurality of pivotally connected tool-supporting frames and embodying novel and improved means for swinging the frames and for retaining the frames in selected pivoted positions.

Another very important object of the present invention is to provide a farm implement including forward and rear pairs of elongated tool holding members and a single mechanism that is actuated to spread the rear and forward pairs of members relative to each other.

A further object of the present invention is to provide a disk harrow composed of a plurality of tool holding frames that are quickly and readily adjusted with respect to each other for making ditches, rows, furrows or the like that are spaced from each other a predetermined distance.

Another feature of the present invention is to provide a tractor-drawn tandem disk harrow of ample design to be utilized for seed bed preparation in tilling or harrowing the soil through the use of two pairs of elongated frames, supporting disks that are arranged one pair immediately behind the other or of a tandem nature.

Another feature of the present invention is the provision of a farm implement so constructed as to permit the same to be extremely economical in operation from a standpoint of easy draft and minimum expense. The easy draft is accomplished through the light weight construction with the same amount of penetration into the soil bed that heretofore has been brought about by excess weight on other model disk harrows. When additional weight is desired or required, it may be added to the tool supporting frames.

Another feature of the present invention is to provide a disk harrow including a novel and improved spring construction or mounting permitting each disk gang to be individually adjusted and allows absolute freedom of movement for each gang independently of the other three gangs forming the implement, with respect to the terrain.

Another very important feature of the present invention is to provide a farm implement that is extremely flexible in construction.

Yet another feature of the present invention is to provide a plurality of tool-supporting frames so constructed as to permit the frames to adjust themselves to the uneven ground and to permit the same to be conveniently maneuverable for making relatively sharp or short turns.

A still further aim of the present invention is to provide an agricultural implement including a plurality of interconnected, relatively adjustable tool-holding frames that are simple and practical in construction, extremely strong and durable in use, small and compact in structure, efficient and reliable in operation, uniform in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the present invention showing in full lines the forward pair of frames spaced parallel to the rear pair of frames and with dotted lines showing the forward pair of frames and rear pair of frames inclined relative to each other;

Figure 2 is a fragmentary group perspective view of the forward portion of the present implement;

Figure 3 is an enlarged transverse vertical sectional view taken substantially on the plane of section line 3—3 of Figure 1;

Figure 4 is a fragmentary perspective view of the rear portion of the present invention; and Figure 5 is a perspective view of the spacer spool used in conjunction with the present invention.

Referring now to the drawings in detail, wherein for the purpose of illustration there is disclosed a preferred embodiment of the present invention, the numerals 10 and 12 represent, generally, a pair of forward or leading tool-supporting frames or members that form the forward portion of the instant farm implement.

Each of the frames 10 and 12 includes upper, substantially rectangular supports 14 from which there depend a plurality of spacer arms or rods 16 that are fixed to attaching flanges or anchor strips 18. The central arms 20 carried by the supports 14 are suitably fixed to central anchoring flanges 22 having forward bifurcated terminals 24 that are apertured to receive suitable fasteners 26 for a purpose which will later be more fully described.

Transverse straps or plates 28 are fixed to the supports 14, adjacent the inner end portions 30 of the supports, and receive upstanding bolts 32. A channel-shaped beam or connecting member 34 forms a connection between the frames or units 10 and 12 and the end portions of the beam 34 are apertured, as at 36, to receive the bolts 32. The upper threaded ends of the bolts 32 receive nuts 38 and washers 40, and coil springs 42 embracing the bolts 32 are biased between the washers 40 and the beam 34 to yieldingly urge the beam 34 toward the frames 10 and 12.

A tool-holding shaft 44 is associated with each of the frames 10 and 12 and receives a plurality of tools or disks 46 that are spaced from each other by suitable spacer sleeves or collars 48. The disks 46 and disks 90 are held against rotation on the shafts 44, preferably by making the sleeves 48 and disks 46 with square openings and the shafts 44 square in cross-section for reception in the square openings in the sleeves 48 and disks 46.

Certain of the sleeves 48 support collars 50 that are secured to the flanges 18 and 22 by fasteners 52 fixed to the collars and received in suitable openings in the flanges 18 and 22, and the fasteners receive complementary nuts in order to attach the supports 14 to the sleeves 49 assembled on the shafts 44.

A pair of longitudinally extending, spaced support members or arms 54 are disposed laterally of the frames 10 and 12, and the rear ends of the members 54 are twisted to provide substantially flat portions 56 that are pivoted to pins or rods 58 depending from the spaced inner end portions of the frames 10 and 12. The members 54 are secured to each other in spaced relationship by plates 60. A channel member 62 is slidably received between the members 54 and is suitably secured to an actuating rod or drawbar 64.

Hanger straps or bars 66 depend from the inner end portions of the frames 10 and 12 and are secured to the members 54 by fasteners or bolts 68 having companion nuts 70, to assure a more even pull.

Secured to the forward end of the channel member 62 is a laterally projecting plate 72 that is pivoted by fasteners 74 to the forward bifurcated end portions 76 of a pair of rearwardly and outwardly inclined connecting bars, links or pitmans 78. The rear angulated ends 80 of the links 78 are pivoted to bifurcated terminals 24 by fasteners 26 and the ends 80 support upwardly and rearwardly inclined brace arms 82 that are pivoted to attaching flanges 84 by fasteners 26 secured to the central portions of the frames 10 and 12.

The rear portion of the present invention consists of a pair of rear tool supporting frames or units designated generally by the numerals 86 and 88, and since the frames 86 and 88 are similar in construction to the frames 10 and 12, the same will not be described in detail. It is noted that the tools or disks 90 carried by the rear frames are disposed so that their concaved surfaces face inwardly, whereas the disks 46 of the frames 10 and 12 are disposed so that their concaved surfaces face outwardly.

Pivoted to and projecting laterally and forwardly from the central portions of the rear units or frames 86 and 88 are arms 92 that are secured to the rear ends of a pair of forwardly and inwardly inclined connecting members 94, the forward ends of which are pivoted to the end portions 96 of the members 54.

Means is provided for connecting the rear frames and for securing the rear frames to the actuating bar 64 and the means consists of an angle member or cross-member 96 that is spaced parallel to and between the forward and rear frames. Forwardly converging links or arms 98 are secured to the angle iron member 96 by fasteners 26 and the forward ends of the links 98 are secured by fasteners 26 to an anchor plate 100 fixed to the actuating rod 64.

Laterally projecting channels 102 are secured to the terminals of the angle iron member 96 and receive pins 104 which are secured to angulated substantially L-shaped attaching straps 106 that extend upwardly and rearwardly from the member 96. The straps 106 are suitably pivoted by fasteners 26 to the leading inner members of frames 86 and 88 toward the inner end portions 108 of the rear frames 86 and 88.

The rear flat terminals 110 of the pins 104 are pivoted, as at 112, to the innermost attaching flanges 114 of the rear frames which correspond to the flanges 18 of the forward frames, fasteners 26 being utilized at the points of pivot. The pins 110 are fixed at their forward ends to the straps 106.

Pairs of ears 116 depend from the straps 106 and pivotally support the eye terminals 118 of downwardly and inwardly inclined, threaded bolts 120 that extend through the angle iron member 96. Nuts 122 are threaded on the bolts 120 and form abutments for coil springs 124 that embrace the bolts 120 and which are biased between the member 96 and the nuts 122.

Suitably held in each of the channel members 102 is a spring housing 126 that receives a spring member 128. The spring members 128 exert a force upon the bolts or pins 104 to restrict rotation of the pins 104 in the channels 102. Any suitable means may be employed for adjusting the resilient force exerted by the springs 128, such as abutments 130 for the springs 128 that are adjustably secured to the channel members 102.

A support 132 is mounted on the members 54 and slidably supports a spring-urged locking pin 134 that is received in a selected one of a plurality of longitudinally spaced openings 136 provided in the member 62. A hand lever 138 is operatively connected to the pin 134 or a cam on the pin 134 so that as the lever 138 is swung vertically the pin 134 will raise to its unlocked position. Since the above locking mechanism is more specifically illustrated in my copending application, Serial No. 77,127, filed February 18, 1949, a further description of the same will not be discussed in conjunction with the instant structure, since other locking devices could be substituted in order to retain the bar 64 adjusted longitudinally within the members 54.

In practical use of the present invention, when the locking pin 134 is raised to its unlocked position, the channel member 62 and bar 64 can be moved forwardly or rearwardly. When the bar 64 is pulled forwardly, the inner end portion 108 of the rear frames 86 and 88 will also be pulled forwardly to swing the outer end portions of the rear frames outwardly, as shown in dotted lines in Figure 1.

Simultaneously with the above operation, the connecting links 78 will be pulled forwardly and the inner end portions of the forward frames 10 and 12 will pivot about the rods 58 to a rearward position with the outer end portions of the forward frames moved to a forward position, as shown by dotted lines in Figure 1.

It will thus be observed that the rear frames 86 and 88 incline rearwardly and outwardly relative to the bar 64, whereas the forward frames 10 and 12 incline forwardly and outwardly relative to the bar 64.

Obviously, the outer ends of the forward frames and the outer ends of the rear frames may be spaced from each other a predetermined distance due to the spacing of the group of openings 136 in which the pin 134 is received.

Having described the invention, what is claimed as new is:

1. A farm implement comprising a pair of elongated tool-supporting frames having inner adjacent ends, a cross-member extending between the inner ends of said frames, a beam connected to said cross-member, a substantially L-shaped strap at each end of said cross-member and attached to the inner ends of the frames, each of said straps having first and second leg portions, a pin fixed to the first leg portion of each strap, said pins being pivotally connected to the inner ends of said frames, connections between the cross-member and the second leg portions of the straps, channels at the ends of the cross-member receiving the pins, and means within the channels restricting rotation of said pins, means forming part of said connections urging the straps from the cross-member.

2. A farm implement comprising a pair of elongated tool-supporting frames having inner adjacent ends, a cross-member extending between the inner ends of said frames, a beam connected to said cross-member, a substantially L-shaped strap at each end of said cross-member and attached to the inner ends of the frames, each of said straps having first and second leg portions, a pin fixed to the first leg portion of each strap, said pins being pivotally connected to the inner ends of said frames, a connection between the cross-member and the second leg portion of each of the straps, channels at the ends of the cross-member receiving the pins, and coil springs within the channels and yieldingly bearing against the pins to restrict rotation of the pins.

3. A farm implement comprising a pair of elongated tool-supporting frames having inner adjacent ends, a cross-member extending between the inner ends of said frames, a beam connected to said cross-member, a substantially L-shaped strap at each end of said cross-member and attached to the inner ends of the frames, said straps each having first and second leg portions, a pin fixed to the first leg portion of each strap, said pins being pivotally connected to the inner ends of said frames, a connection between the cross-member and the second leg portion of each of the straps, channels at the ends of the cross-member receiving the pins, coil springs within the channels and yieldingly bearing against the pins to restrict rotation of the pins, and abutments adjustably secured to the channels and overlying the coil springs to force the springs toward the pins.

4. A farm implement comprising a pair of elongated tool-supporting frames having inner adjacent ends, a cross-member extending between the inner ends of said frames, a beam connected to said cross-member, a substantially L-shaped strap at each end of said cross-member and attached to the inner ends of the frames, each of said straps having first and second leg portions, a pin fixed to the first leg portion of each strap, said pins being pivotally connected to the inner ends of said frames, a connection between the cross-member and the second leg portion of each of the straps, channels at the ends of the cross-member receiving the pins, and means within the channels yieldingly bearing against the pins to restrict rotation of the pins, said connections including bolts pivoted to the straps and projecting through the cross-member, nuts threaded on the bolts and coil springs surrounding the bolts and biased between the nuts and the cross-member to bias the straps from the cross-member.

5. A farm implement comprising a forward pair of elongated frames having inner adjacent ends, a rear pair of elongated frames having inner adjacent ends, a pair of spaced longitudinally extending support arms having rear ends pivoted to the inner ends of said forward pair of frames, a member slidably received between said arms and including forward and rear portions, pitmans connecting the forward portion of said member to an intermediate portion of each forward frame, a pair of channels carried by the rear portion of said member and disposed transversely of the rear frames, pins received in the channels and pivoted to the inner ends of the rear frames, straps having first ends attached to the pins and pivoted to the inner ends of the rear frames, an adjustable connection between the other ends of the straps and the rear portion of said member, additional pitmans connecting the forward frames to the rear frames, and means mounted on the support arms releasably engaging the member for locking the member longitudinally adjusted relative to the arms.

6. The combination of claim 5 and springs mounted in the channels and yieldingly bearing against the pins to restrict rotation of the pins.

7. The combination of claim 5 wherein said arms include rear ends projecting rearwardly of said forward frames, the forward ends of said additional pitmans being pivoted to the rear ends of said arms.

KELLY P. RYAN.

References Cited in the file of this patent

UNITED STATES PATENTS

| Number | Name | Date |
|---|---|---|
| Re. 22,333 | White | June 8, 1943 |
| 2,266,590 | Dyrr | Dec. 16, 1941 |
| 2,380,298 | Dyrr | July 10, 1945 |